March 1, 1938. V. A. KASIN 2,110,045
MOTOR VEHICLE BRAKE MECHANISM
Filed Sept. 27, 1935 2 Sheets-Sheet 1
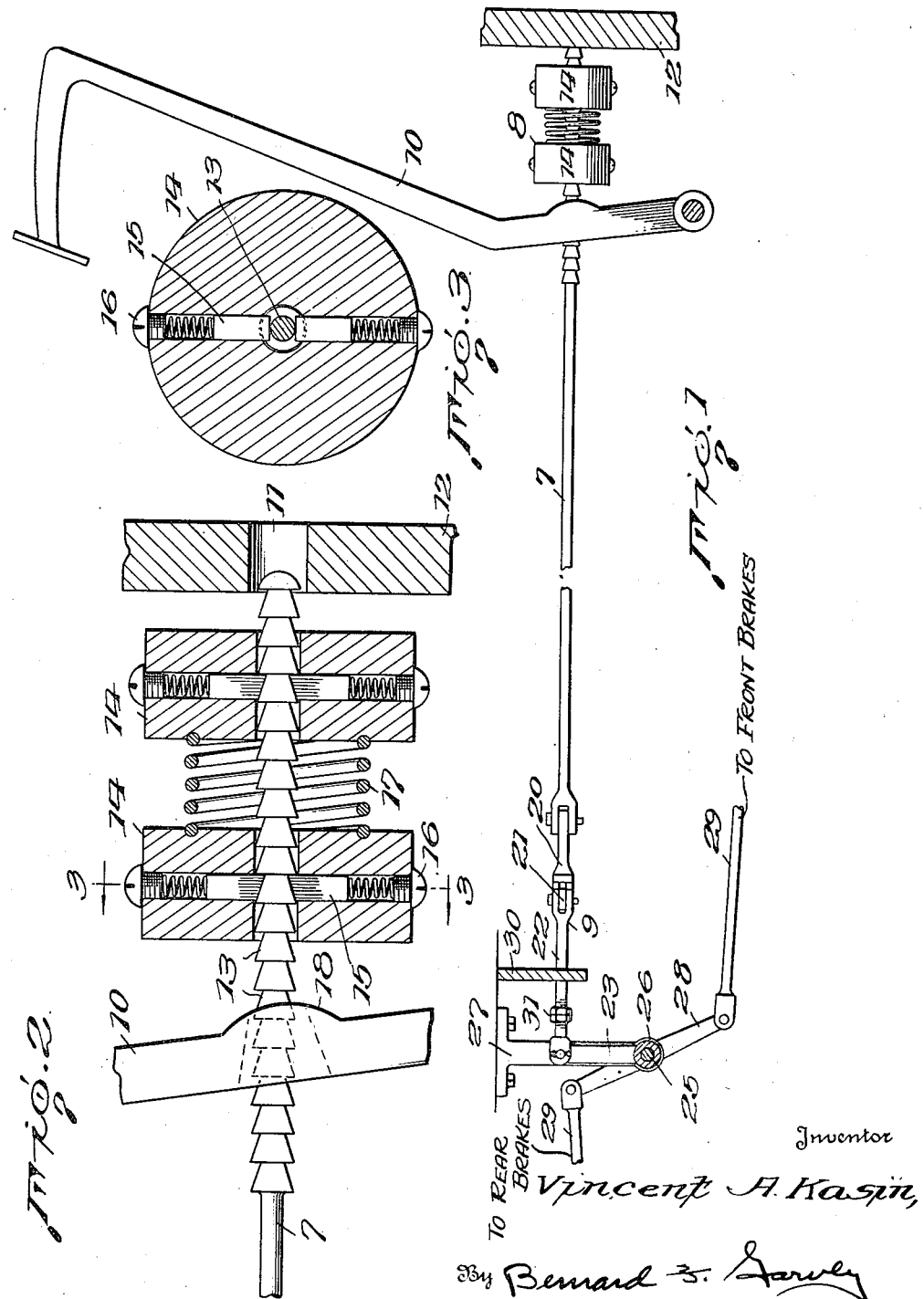
Inventor
Vincent A. Kasin,
By Bernard F. Garvey
Attorney

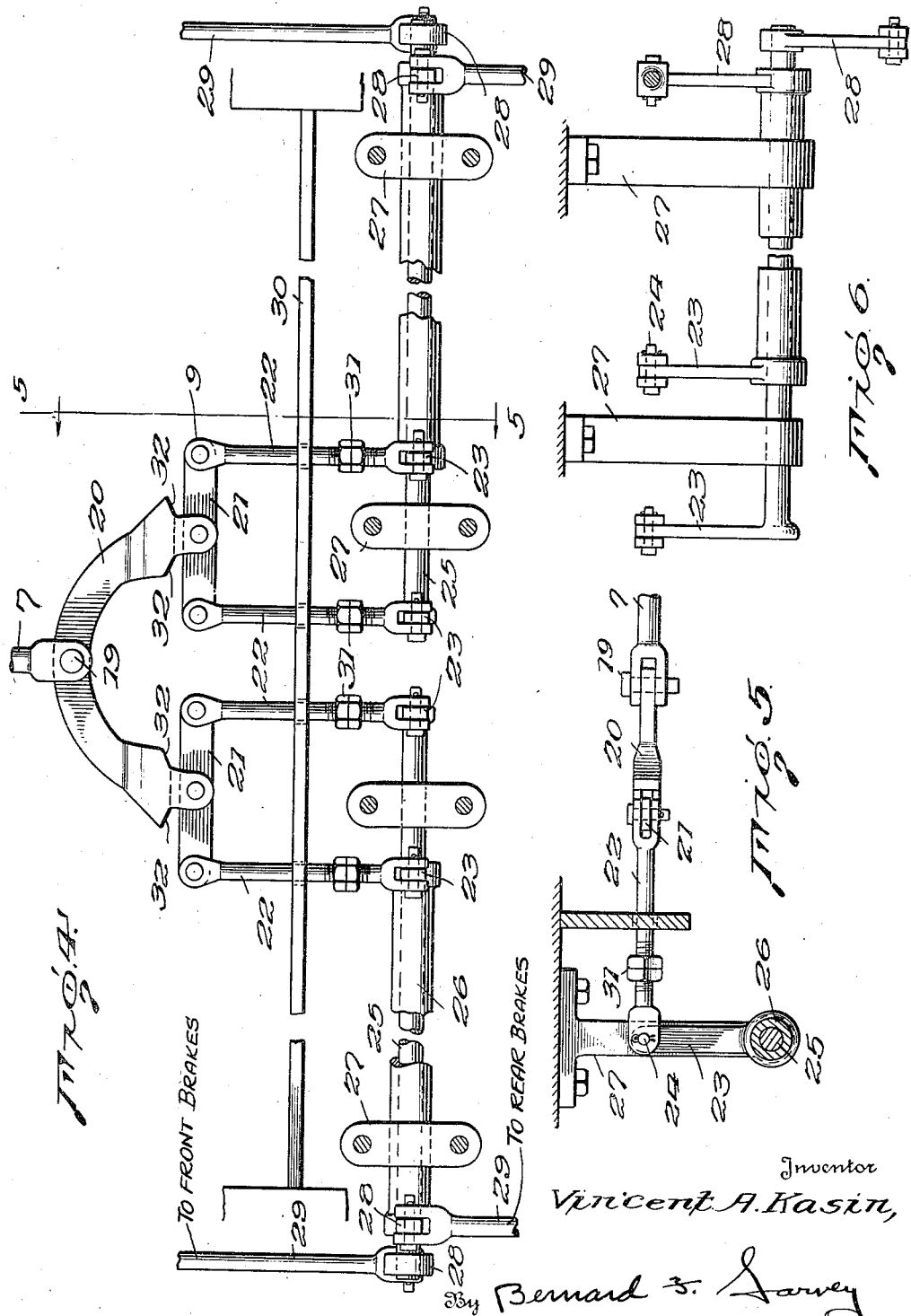

Patented Mar. 1, 1938

2,110,045

UNITED STATES PATENT OFFICE 2,110,045

MOTOR VEHICLE BRAKE MECHANISM

Vincent A. Kasin, Houston, Tex.

Application September 27, 1935, Serial No. 42,536

2 Claims. (Cl. 188—204)

The present invention consists of a motor vehicle brake mechanism which precludes failure of the mechanism in toto when only a part of the mechanism is rendered inoperative, the mechanism also including an automatic take up which eliminates the necessity of periodical brake adjustment and renders the extent of throw of the brake pedal constant regardless of the condition of the brake shoes.

Further advantages within the teaching of this invention are to provide mechanism which controls the brakes of all the vehicle wheels, the mechanism being simple and incumbersome to permit brake operation with a minimum manual effort yet assuring direct and positive action of the brakes under all operating conditions.

Other objects of the invention will be apparent from the following description of the present preferred form of the invention taken in connection with the accompanying drawings, wherein:—

Fig. 1 is a side elevational view of a brake mechanism constructed in accordance with the present invention illustrating its application.

Fig. 2 is a fragmentary longitudinal sectional view of the wear take-up forming a part of the brake mechanism of the present invention.

Fig. 3 is a cross sectional view taken on the line 3—3 of Fig. 2 looking in the direction of the arrows, showing to advantage the manner of mounting one of the plates of the take up unit on the drive rod.

Fig. 4 is a fragmentary plan view of the mechanism showing the brake applying unit and manner of mounting the same on a vehicle.

Fig. 5 is a vertical sectional view taken on the line 5—5 of Fig. 4 looking in the direction of the arrows, showing to advantage the manner of suspending the brake applying unit to the vehicle, and Fig. 6 is a fragmentary rear elevational view of one side of the brake applying unit of the mechanism illustrating the manner of mounting the same on the vehicle.

The device of the present invention embodies a brake rod 7 having mounted thereon at one end a wear take-up unit, generally designated 8, the opposite end of the rod being connected with a brake applying unit, generally designated 9. The rod 7 is also equipped with a pedal 10 through which the rod passes, the pedal being arranged in close proximity to the take-up unit 8.

The brake rod 7 is mounted in a vehicle in the usual manner, one end thereof extending through an opening 11, formed in a part 12 of the automobile chassis. The front end of the rod is formed to provide a series of conical serrations 13 upon which the unit 8 is slidably mounted.

The take-up unit 8 consists of twin plates 14, each of which has an axial bore through which the serrated end 13 of the rod 7 is movably mounted. The plates are normally held in a predetermined position on the rod by spring detents 15, a pair of which is slidably mounted in each of the plates 14. The spring detents may be removed from the plates by disengaging screws 16 from the outer ends of the openings in which the detents are mounted. Upon reference of Fig. 2 of the drawings, it will be apparent that the detent openings open into the bore of each plate to permit the inner ends of the detents to engage the serrations 13. The detents are shaped to conform to the contour of the serrations, so as to permit the rod to be freely moved in one direction, yet preventing movement of the rod in the opposite direction. To normally hold the plates 14 separated at a predetermined distance, a helical spring 17 is employed, the terminal convolutions thereof resting in corresponding grooves, formed in the inner faces of the plates. When the brake pedal 10 is urged in the direction of the unit 8, a protrusion 18 on the pedal bar will engage the rear of the plates 14, continued pressure on the pedal urging the unit forwardly and correspondingly moving the rod 7 through the opening 11. This action brings the forward plate 14 into close proximity to, or in engagement with the front 12 of the chassis depending upon the condition of the brake mechanism at the time the brake is applied. If there is wear to take-up, the forward plate 14 abuts the part 12 of the chassis, to thereby place the spring 17 under compression. When the pressure on the pedal is released, the expansive force of the spring urges the rear plate 14 in the direction of the pedal to thereby shorten the throw of the pedal in a manifest manner. It is apparent, therefore, that any slack in the brake mechanism is absorbed automatically by the action of the take-up unit whether the slack be due to wear in the brake shoes or to a failure of some part of the brake mechanism.

The unit 9 which is pivotally connected to the brake rod 7 at 19 consists of a yoke 20, the ends of which are pivotally engaged to links 21 midway the ends of the latter. The opposite ends of the links are in turn pivotally engaged with rods 22, the rear end of each of said rods being bifurcated. The branches of the bifurcation of each rod straddle an arm 23, and are pivotally connected thereto by a pin 24. The arms 23 are formed on the terminals of rock shafts 25 and 26, the shafts 25 being solid, and the shafts 26 tubular to permit the shafts to be arranged in sleeved engagement. These shafts are pendently supported by brackets 27 which hang from the vehicle chassis. The shafts 25 and 26 are equipped at their outer ends with arms 28 of a design complementing the arms 23. The arms 28 are pivotally engaged by rods 29, the rods of the shafts 25 extending to the brakes of the front wheel (not shown in the drawings), while the rods of the shafts 26 extend to the rear brake shoes of the vehicle (not shown in the drawings).

An abutment bar 30 is carried by the vehicle chassis and is provided with intermediate openings through which the rods 22 are slidably connected. Movement of the latter forward through the bar is limited by jam nuts 31, a pair of the latter being screwthreaded on each of the rods 22. When pressure is exerted on the brake rod 27, the brake shoes are applied by rocking the shafts 25 and 26 in a manifest manner. In the event of the failure of any part of the brake mechanism to the rear of the bar 30, movement of the section of the mechanism which has failed is limited by impingement of the jam nut of the deficient section against the abutment bar 30. Where the failure is forward of the abutment bar, movement is limited by engagement of the links 21 with extensions 32 formed in proximity to the inner ends of the yoke member 20.

Ordinary wear in the brake mechanism will be absorbed by the automatic take-up mechanism already described. Additionally, where there is failure of any part of the brake mechanism, with corresponding loss of motion in the brake mechanism, this is likewise absorbed by the automatic take-up through the exertion of pressure on the foot pedal 10. It is, of course, manifest that the take-up 8 may be conveniently adjusted when found necessary.

Although, I have herein described a preferred form of the invention to carry out its objects, nevertheless I am aware that various changes may be made herein, especially in the details of construction, proportion and arrangement of parts within the scope of the claims herewith appended.

What is claimed is:

1. A motor vehicle brake mechanism including, in combination, two pairs of brakes, mechanism connected with the brakes and operable as a unit to simultaneously apply all of the brakes, said mechanism embodying movement control means whereby failure of a part of the mechanism leaves the remaining mechanism in an operative condition, and automatic take up means associated with the mechanism to absorb lost motion caused by the failure of a part of said mechanism.

2. A motor vehicle brake mechanism including, in combination, front and rear brakes, mechanism in connection with the brakes for applying the latter, an abutment bar associated with said mechanism to maintain the mechanism in operative condition on the failure of a part of the mechanism, and means engaged with said mechanism to take up slack therein when the brakes are applied through the operation of the mechanism.

VINCENT A. KASIN.